Patented Feb. 25, 1941

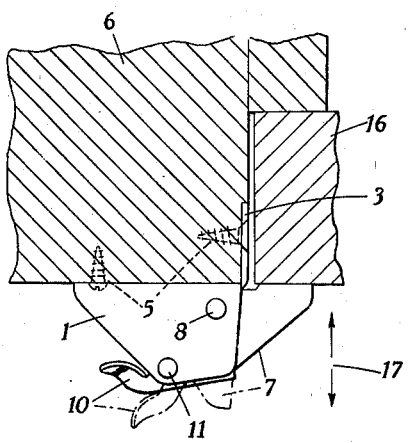
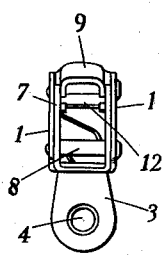
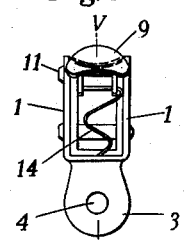
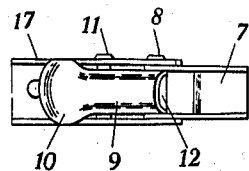
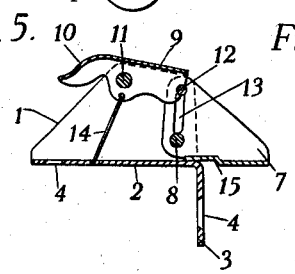
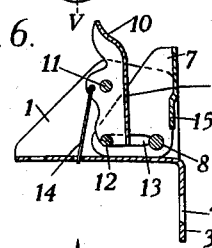
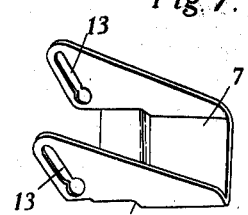
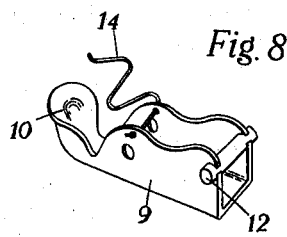
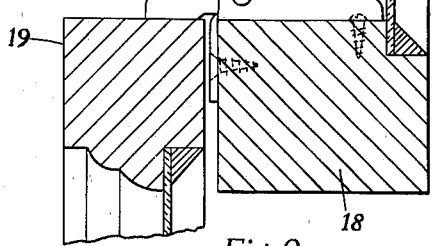

2,232,965

UNITED STATES PATENT OFFICE 2,232,965

FASTENING MEANS FOR DOORS AND THE LIKE

Albert Henry Franks Perl, Birmingham, England

Application May 16, 1939, Serial No. 273,831
In Great Britain May 19, 1938

5 Claims. (Cl. 292—226)

The invention relates to fastening means for securing doors, windows and the like, and has for its object the provision of a fastener which is simple in construction and operation and can be manufactured economically. A fastener according to the invention can be of a compact form capable of use in confined spaces.

The fastening device according to the invention comprises a pivoted bolt and means operable to turn the bolt into and out of its fastening position, said operating means also serving to lock the bolt automatically in the fastening position so that the bolt can be retracted only by means of its operating means. Toggle means may be used for turning the bolt, when the bolt and an operating lever may together constitute a toggle pair. The operating lever may be moved by direct pressure of a finger, and a spring may be included in the mechanism to cause the bolt to move with a snap action.

One form of the invention, operable by finger pressure, is illustrated by way of example in the accompanying drawing in which:

Fig. 1 is a plan of the fastener applied to the jamb of the door, the bolt being shown by full lines in the engaging position, and by dotted lines in the retracted position, Figs. 2, 3 and 4 are elevations of the fastener detached from a door but with the bolt turned to the extended or fastening position, the end elevations being views looking upon the opposite ends of the fastener, Fig. 5 is a sectional view, the section being taken on the line V—V of Fig. 3, Fig. 6 is a sectional view similar to Fig. 5 but showing the bolt in a retracted position.

Figs. 7 and 8 are perspective views of main parts of the device,

Fig. 9 shows the fastener applied to a vertically sliding sash window.

Referring to the accompanying drawings the operating mechanism is pivoted between the side wings 1 of a base 2 which is bent up from a metal stamping which forms a housing for the operative parts of the device. The base and a lug 3 thereon are pierced by holes 4 which receive screws 5 (Fig. 1) by which the fastener is fixed to the door jamb 6 or other part. The provision of the lug 3 ensures a secure fixing because the screw passing therethrough is not subjected to end thrust when pressure is applied to the door. A bolt 7, which is a metal stamping bent to channel form, is pivoted on a pin 8 which is fixed in the side wings of the base 2. An operating lever 9, provided with a finger piece 10, is pivoted on a pin 11 secured in the side wings 1. A pin 12 secured in the operating lever 9 engages freely within slots 13 in the bolt 7. A compression spring 14 attached at one end to the lever 9 and located at the other end in a hole in the base 2 holds the pin 12 at the appropriate end of the slots 13 in either position of the bolt. The spring also imparts a snap action to the bolt.

Referring more particularly to Figs. 5 and 6, the face of the bolt is set back at 15 so that that portion of the face which makes contact with the door is substantially in line with that surface of the base 2 which butts against the door jamb. The face of the bolt may be provided with a rubber, felt or other pad to prevent injury to the door.

While the bolt 7 is being moved from one position to the other the pin 12 moves along the slots 13 and back again. The spring 14 then ensures that the pin is always moved back to the appropriate end of the slots. In Fig. 5 it will be noted that the pin 12 is at the end of the slots 13 so that the centre line joining the pins 11 and 12 is substantially at right angles to the slot 13, whereby any attempt to move the bolt 7 about its pivot results in a direct thrust on the pin 11. Thus, the bolt is immovable except in that it can be rocked by a movement of the lever 9. Similarly in Fig. 6 it will be seen that the pin 12 is at the same end of the slots 13 and the centre line of the pins 11 and 12 is substantially perpendicular to the walls of the slot 13, so that any attempt to rock the bolt into fastening position except by use of the lever 9 results in a radial thrust on the pin 11. Further movement of the bolt in the opposite direction is of course prevented by engagement of the bolt with the base 2. The lever 9 and bolt 7 constitute a pair of toggle levers, the relative positions of the pivots of which are so chosen as to render the levers self-locking in both their extreme positions.

The present construction allows the bolt 7 to move through rather more than 90° so that when it is retracted it can lie behind the edge of the part to which it is attached and so provide ample clearance for the opening and closing of the door or the like. This wide angular movement is obtained by making the distance between the pins 11 and 12 as great as possible. In order that this shall be done, and yet maintain the fastener compact, the pin 12 is held in open sided holes in the lever 9 so that it, and the lever nose, can just clear the stationary pin 8.

From Fig. 1 it will be seen that the door 16 moves in a horizontal plane in the direction of the arrows 17 while the bolt also moves in a horizontal plane in the same direction.

In the case of a door or casement window which opens outwards, the fastening device would be secured to the edge of the door or window instead of to the stationary surround and the bolt, when operated, would make contact with the surround.

Fig. 9 shows the application of the invention to a sliding sash window. The fastener is secured to the bottom rail 18 of the upper sash and the bolt 7, when in the fastening position, will make contact with the upper rail 19 of the bottom sash. With the parts in the position shown the bottom sash cannot be raised nor can the upper one be lowered. The sashes slide in the direction of the arrows 20 and the bolt 7 is moved in the same direction when moved into and out of the fastening position.

If desired the lever 9 can be operated other than by direct manual pressure. For example it may be moved by a third lever, cam or the like which in turn is manually or otherwise operated. Again the operating lever may be operated mechanically by a cable, or it may be connected to the armature of a solenoid or electro-magnet and be moved upon the closure of the circuit of the electromagnetic device. Such arrangements allow of remote control. Provision may be made for the bolt operating mechanism to be tripped automatically upon the closure of the door or the like, the final part of the closing movement of the door being used to accomplish this; an arrangement of this kind is useful when the fastener is used for a gate.

Other modifications may be made without departing from the invention. For instance, instead of piercing the lug 3 for receiving a screw or the like, the lug may be provided with a permanently attached pin, spike or the like which is pushed into a door jamb or the like and, not being subjected to end pull if pressure is applied to the door, this pin provides a sufficiently firm fixing for the fastener to enable it, if desired, to be applied temporarily to a door or the like, such as when travelling. Again, instead of a toggle arrangement any other mechanism can be used which will turn the bolt and lock it in the fastening position and preferably lock it also in the retracted position.

I claim:

1. A fastening device for doors, windows and the like, comprising a housing having a mounting base, a bolt pivoted in said housing to swing into and out of one end of the housing in a plane substantially perpendicular to said base, the bolt being adapted to project in its fastening position beyond the said end of the housing and in substantial alignment with the base, a separate pivoted operating lever having a pin and slot connection with the bolt for operating the same, the pin of said pin and slot connection cooperating with the appropriate end of the slot thereof in either of the bolt's fastening and disengaged positions to lock the bolt therein against displacement under force applied to the bolt.

2. A fastening device for doors, windows and the like, comprising a support having spaced apart sides, an operating lever having spaced apart sides disposed longitudinally of and between the sides of the support and pivoted thereto near the top of the support, a pin at one end of said lever carried by and extending across the sides thereof, an angle lever bolt disposed longitudinally of and pivoted between the sides of the support near the bottom and near one end thereof, the bolt having a slot in one lever arm thereof and the pin carried by the operating lever passing through said slot, the free end of said operating lever being adapted to be manually operated, the bolt upon operation of said lever being adapted to be turned on its pivot by the coaction of said pin and slot between its fastening position where said other lever arm of the bolt projects beyond the end of the support and its disengaged position where the bolt is retracted to bring its said other arm within the support, the end of the operating lever that carries said pin and said bolt being adapted to nest one within the other upon the bolt being retracted, said pin cooperating in each of said positions with an end of said slot to lock the bolt against movement other than that applied through said lever.

3. A fastening device as defined in claim 2, wherein the bolt is of substantially triangular shape having the said slot located along a side adjacent the bolt's pivot, the other side adjacent the bolt's pivot constituting the working face of the bolt.

4. A fastening device for doors, windows and the like, comprising a channel-shaped support, an inverted channel-shaped lever disposed longitudinally of and between the channel sides of the support and pivoted intermediate its ends thereto near the top of the support, a pin at one end of said lever carried by and extending across the channel sides thereof, a channel-shaped bolt disposed longitudinally of and pivoted at one end between the channel sides of the support near the bottom thereof and near one end of the support, the bolt being turnable between its fastening position where it projects beyond the said end of the support and its disengaged position where the bolt is retracted within the support, the bolt having a pair of aligned slots in its channel sides at their inner ends, said pin carried by said lever extending into said slots, and the end of said lever that carries said pin and the channel sides of the bolt being adapted to nest one within the other upon the bolt being retracted, the free end of said lever being adapted to be manually operated, the bolt upon operation of said lever being adapted to be turned about its pivoted end by the coaction of said pin and slots, said pin cooperating in each of the bolt's positions with an end of said slots to lock the bolt against movement other than that applied through said lever.

5. A fastening device as defined in claim 4 and comprising a compression spring disposed between the bottom of the support and the lever adjacent its pivot, said spring being compressed to a dead centre position upon operation of the lever in either direction whereby to impart a snap action to the device.

ALBERT HENRY FRANKS PERL.